United States Patent  
Ahlberg et al.

(10) Patent No.: US 12,487,732 B2  
(45) Date of Patent: Dec. 2, 2025

(54) AUTOMATED PREDICTIVE SCORING IN EVENT COLLECTION

(71) Applicant: Recorded Future, Inc., Somerville, MA (US)

(72) Inventors: Christopher Ahlberg, Watertown, MA (US); Erik Wistrand, Gothenburg (SE); Johan Thoresson, Lund (SE); Staffan Truvé, Gothenburg (SE); Kaspar Weilenmann, Gothenburg (SE); Jan Sparud, Gothenburg (SE); Mia Nordström, Mölnlycke (SE)

(73) Assignee: Recorded Future, Inc., Somerville, MA (US)

( * ) Notice: Subject to any disclaimer, the term of this patent is extended or adjusted under 35 U.S.C. 154(b) by 0 days.

(21) Appl. No.: 17/897,779

(22) Filed: Aug. 29, 2022

(65) Prior Publication Data

US 2023/0244365 A1    Aug. 3, 2023

Related U.S. Application Data

(63) Continuation of application No. 17/163,767, filed on Feb. 1, 2021, now Pat. No. 11,429,261, which is a continuation-in-part of application No. 13/856,867, filed on Apr. 4, 2013, now Pat. No. 10,908,792.

(60) Provisional application No. 61/620,393, filed on Apr. 4, 2012.

(51) Int. Cl.
*G06F 3/048* (2013.01)
*G06F 3/04842* (2022.01)
*G06F 16/2458* (2019.01)
*G06F 16/951* (2019.01)
*G06Q 10/10* (2023.01)

(52) U.S. Cl.
CPC ...... *G06F 3/04842* (2013.01); *G06F 16/2477* (2019.01); *G06F 16/951* (2019.01); *G06Q 10/10* (2013.01)

(58) Field of Classification Search
CPC ............ G06F 3/04842; G06F 16/2477; G06F 16/951; G06Q 10/10
See application file for complete search history.

(56) References Cited

U.S. PATENT DOCUMENTS

| 7,730,030 B1 * | 6/2010 | Xu ......................... G06Q 10/10 707/758 |
| 8,843,831 B2 * | 9/2014 | Brookhart ............. G06F 16/958 715/752 |
| 9,746,985 B1 * | 8/2017 | Humayun ............. G06F 16/904 |

(Continued)

*Primary Examiner* — Mahelet Shiberou
(74) *Attorney, Agent, or Firm* — Kristofer E. Elbing

(57) ABSTRACT

In one general aspect, an interactive event-based information system is disclosed that includes an event-based data store for storing information about events selectively extracted from a plurality of machine-readable information sources. A live feed extraction interface is responsive to the event-based data store and has a feed publication output operative to publish a live feed of selected information about events. A live event feed user interface includes a live feed display interface operative to present a succession of visual information elements corresponding to events covered in the live event feed, and a drill-down interface responsive to user interaction to provide access to further information about the information elements from the data store.

8 Claims, 3 Drawing Sheets

(56) References Cited

U.S. PATENT DOCUMENTS

| | | | |
|---|---|---|---|
| 2006/0031114 A1* | 2/2006 | Zommers | G06Q 10/06314 705/7.33 |
| 2008/0033652 A1* | 2/2008 | Hensley | G06Q 10/08 702/5 |
| 2008/0065405 A1* | 3/2008 | Adelman | G06Q 50/01 705/319 |
| 2009/0132581 A1* | 5/2009 | Ahlberg | G06F 16/334 707/E17.022 |
| 2011/0041082 A1* | 2/2011 | Nguyen | G06Q 10/10 715/752 |
| 2012/0005215 A1* | 1/2012 | Chow | G06Q 50/01 707/748 |
| 2013/0238356 A1* | 9/2013 | Torii | G06Q 10/10 705/2 |
| 2013/0238989 A1* | 9/2013 | Chu | G06F 16/9535 715/273 |

\* cited by examiner

AUTOMATED PREDICTIVE SCORING IN EVENT COLLECTION

CROSS-REFERENCE TO RELATED APPLICATION

This application is a continuation of U.S. application Ser. No. 17/163,767, filed Feb. 1, 2021, which is a continuation of U.S. application Ser. No. 13/856,867, filed Apr. 4, 2013, which claims the benefit under 35 U.S.C. 119(e) of U.S. provisional application Ser. No. 61/620,393 filed Apr. 4, 2012, which are all herein incorporated by reference. This application is also related to U.S. Application Nos. 20100299324 and 20090132582 both entitled INFORMATION SERVICE FOR FACTS EXTRACTED FROM DIFFERING SOURCES ON A WIDE AREA NETWORK as well as to U.S. Application Ser. No. 61/550,371 entitled SEARCH ACTIVITY PREDICTION and to U.S. Application Ser. No. 61/563,528 entitled AUTOMATED PREDICTIVE SCORING IN EVENT COLLECTION, which are all herein incorporated by reference.

FIELD OF THE INVENTION

This invention relates to an apparatus and method for interactively providing access to event-based information.

BACKGROUND OF THE INVENTION

The above-referenced applications provide a framework for predicting facts from sources such as internet news sources.

SUMMARY OF THE INVENTION

In one general aspect, the invention features an interactive event-based information system that includes an event-based data store for storing information about events selectively extracted from a plurality of machine-readable information sources. A live feed extraction interface is responsive to the event-based data store and has a feed publication output operative to publish a live feed of selected information about events. A live event feed user interface includes a live feed display interface operative to present a succession of visual information elements corresponding to events covered in the live event feed, and a drill-down interface responsive to user interaction to provide access to further information about the information elements from the data store.

In preferred embodiments the live event feed user interface can further include an analysis publication input responsive to user input to add information to the event-based data store for publication to the live event feed. The system can include analysis authoring tools responsive to user interaction to insert references to information about events in the data store to the added information. The live-feed display interface can present a continuous succession of story items. The drill-down interface can include a story-item-based drill-down tool. The drill-down interface can include a map-based drill-down tool.

In another general aspect, the invention features a method of interacting with event-based information that includes storing event-based information, continuously selecting and extracting information about events from the stored event-based information, continuously publishing the extracted information as a live event stream, receiving drill-down input from users that reference the published information in the event stream, and providing access to further stored event-based information stored in the step of storing in response to the drill-down input. In preferred embodiments, the method can further include receiving analysis items from users and publishing them to the event stream.

BRIEF DESCRIPTION OF THE DRAWING

FIG. 2 is a screenshot of an illustrative interactive event screen for the system of FIG. 1; and FIG. 3 is a screenshot of an illustrative drill-down information screen for the system of FIG. 1.

DETAILED DESCRIPTION OF AN ILLUSTRATIVE EMBODIMENT

Figure 1:
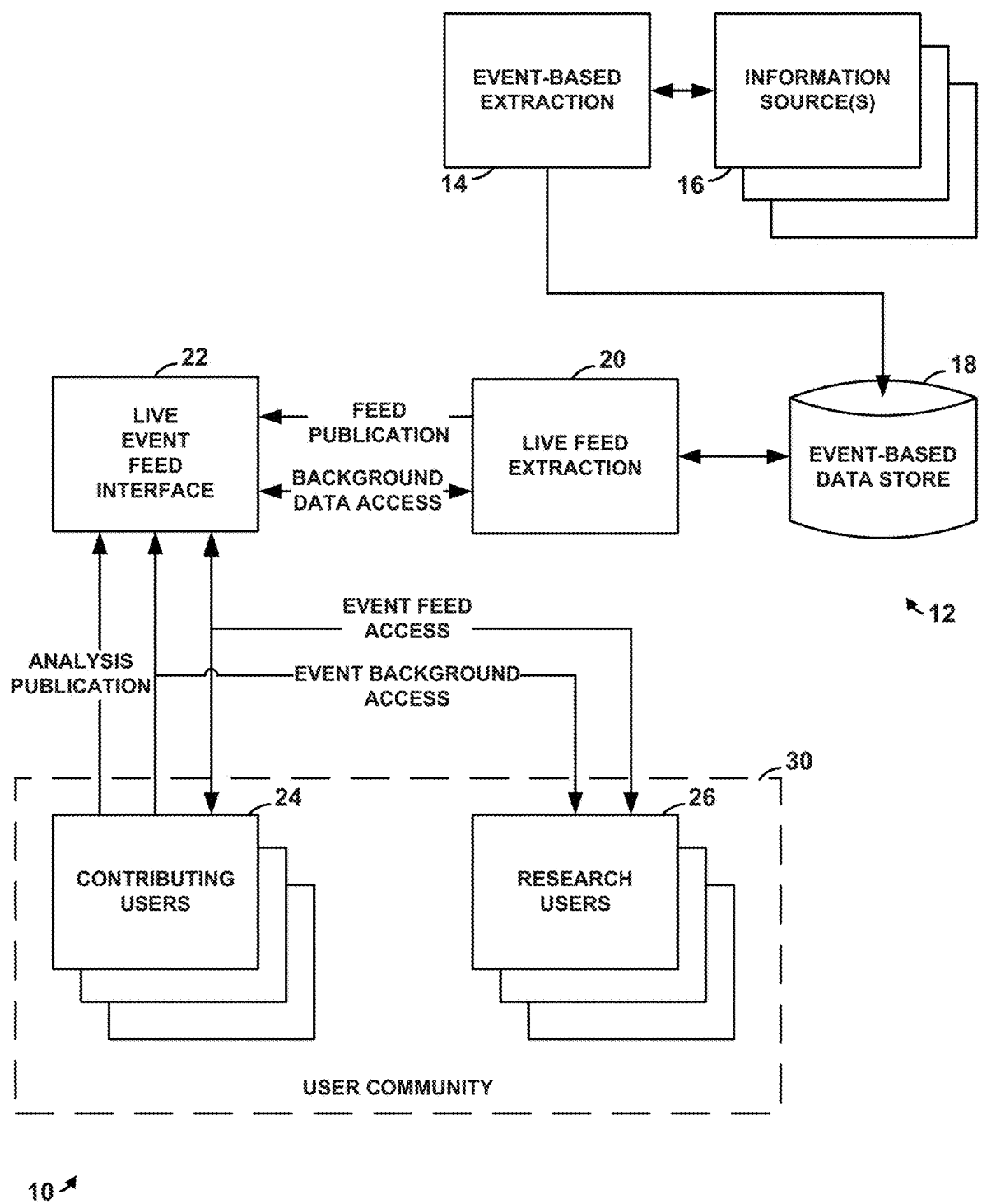
FIG. 1 is a block diagram of an illustrative interactive event-based information system according to the invention.

Referring to FIG. 1, an illustrative interactive event-based information system 10 according to the invention includes a event-based extraction system 12 uses event-bases extraction logic 14 to extract facts from information sources 16, such as on-line news sources, and stores them in an event-based data store 18. The extraction can be performed in a number of ways, including those presented in the above-referenced applications. In one embodiment the Recorded Future API is used. This system provides a live updated dataset of computationally extracted, canonical and clustered, events (i.e. meaningfully grouping multiple reporting on the same events) from many media sources and across many types.

The canonical and clustered events correspond to "real world events," broken down by appropriate time period. I.e., all the natural disaster reports around Hurricane Irene can become grouped into an event cluster. Such clustered/canonical events are for simplicity referred to as events in this document.

The system 10 also includes live feed extraction logic 20 that extracts salient events from the event-based data store 18 for publication. This extraction can be performed in a number of ways depending on what is considered salient for a particular user group. In one illustrative embodiment, the extraction logic is optimized to extract events relating to international geopolitical events from information sources that can be tailored to this subject matter area. Other event-based subject matter areas could also be monitored, such as finance, national politics, and/or celebrity news, and other types of specialized events that might not be thought of as newsworthy in all but a small or even private circle could be monitored as well, such as climactic events, intelligence reports, or computer security breaches.

Figure 2:
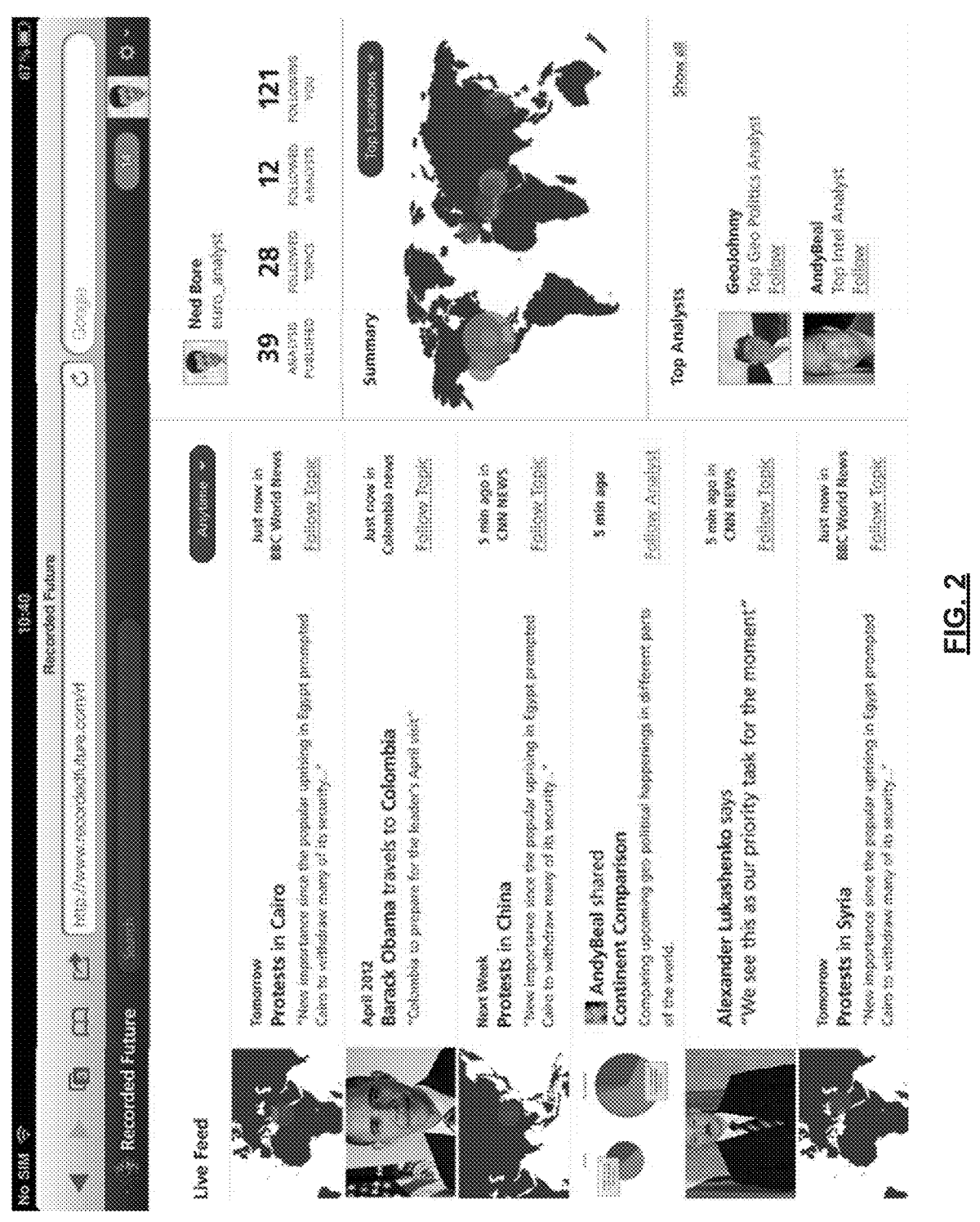

Referring also to FIG. 2, the live feed extraction logic 20 continuously monitors the event based data store 18 and provides extracted publication information about events that meet predetermined threshold criteria to a live feed interface 22 for publication. This interface is typically a browser-based interactive information presentation tool that can present information to users and receive input from them. The live event feed interface presents the extracted publication in a publication display area of the screen, preferably continuously. It should also preferably provide fresh information, although the required publication speed may vary depending on the type of subject matter accessed.

In the present embodiment, the information takes the form of a downwardly scrolling stream of story units that can each include a picture and text, although other methods of presentation could also be devised. Also provided are one or more interactive tools that allow the user to drill down into information that relates to published stories, follow analyst users, or adjust system preferences. Automated user profiling tools can also be provided, to tailor the publication of stories for individual users based on their usage.

Figure 3:
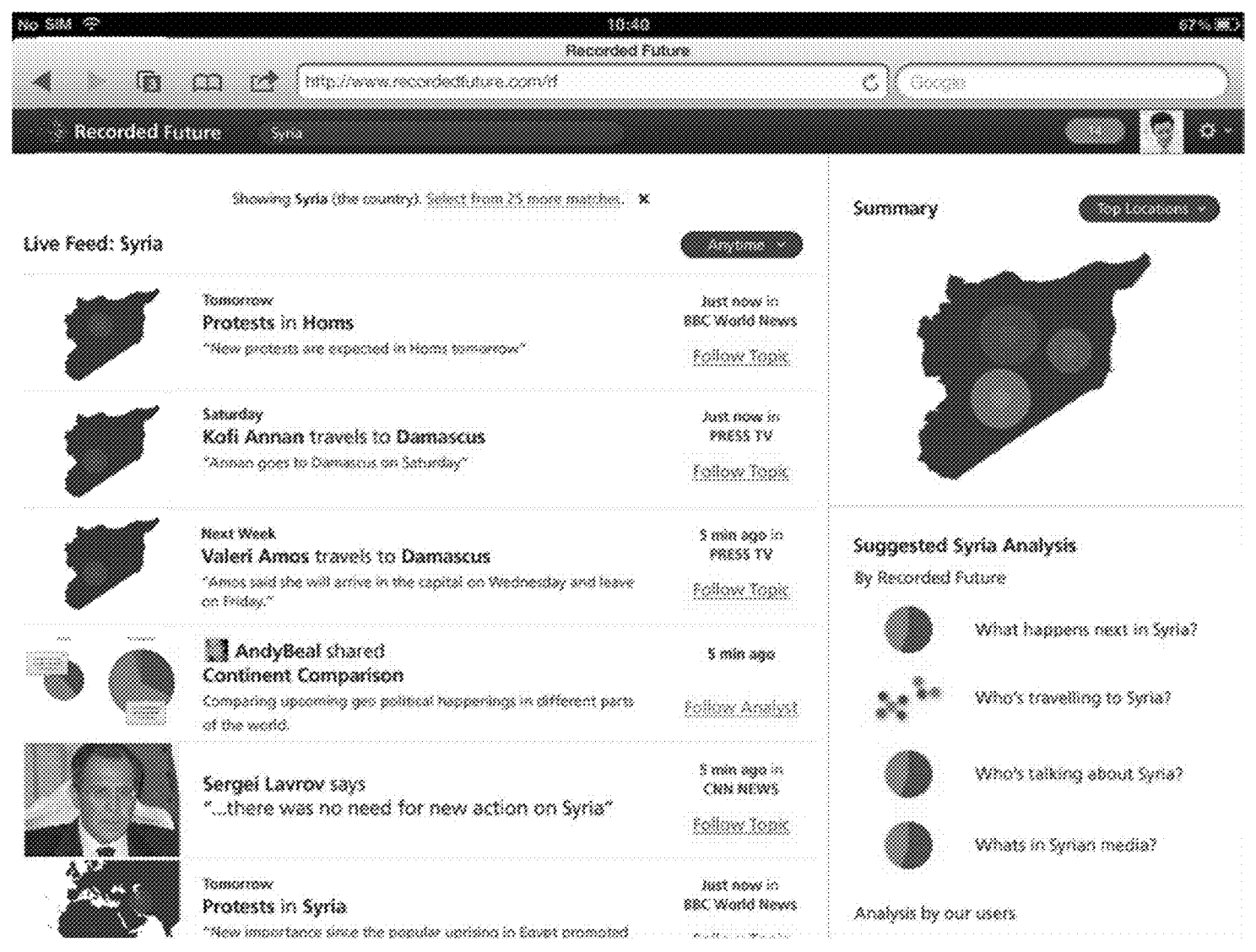

Referring also to FIG. 3, the drill-down tool(s) allow the user to extract further information about the displayed events from the event-based data store 18. These can operate by interaction with the story units (e.g., by clicking on them) or by other approaches, such as by interaction with a map-based drill-down interface. If a user is interested in information about developments in Syria, for example, he or she might explore information about events in different parts of the country using the map interface. Some users (i.e., research users) might be content to just use the system in this way.

Other users (i.e., analyst users) might also want to post further information, such as an analysis of information that that user has authored based on his or her interactions with the system. These posts can be stored in the data store for drill-down access and/or posted in the publication feed to all users or to users who choose to follow a particular analyst. Depending on the design objectives of the system, the system can provide an admission test to analysts or it can allow all users in the user base to submit analyses.

The system can facilitate the inclusion in analyses of references to other event-based information in the event-based data store. This can help to ensure that conclusions in the analyses are clearly supported by facts and to allow readers of the analyses to be meaningfully guided through them. This referencing can be encouraged by providing dedicated authoring tools that easily allow users to insert references, such as links to event-based data, including story items or other analysis posts.

The system described above has been implemented in connection with a special-purpose software program running on a general-purpose computer platform, but it could also be implemented in whole or in part using special-purpose hardware. And while the system can be broken into the series of modules and steps shown in the various figures for illustration purposes, one of ordinary skill in the art would recognize that it is also possible to combine them and/or split them differently to achieve a different breakdown.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. An interactive information system, including a processor and a storage device including instructions configured to run on the processor, comprising:
    an interface for providing access to a plurality of users in a user base;
    a data store for storing published computer security information items continuously and selectively extracted from a plurality of machine-readable information sources,
    a first information posting interface for a first user that allows the first user in the user base to post information items that reference one or more of the published computer security information items stored in the data store for viewing by other users in the user base,
    a second information posting interface for a second user that allows the second user in the user base to post information items that reference one or more of the published computer security information items stored in the data store for viewing by other users in the user base, and
    one or more interactive user interfaces that each include:
    a display area for displaying information about at least some of the information items,
    user selection tools to tailor the selection of the published information items for each particular user, and
    a drill-down interface responsive to user interaction to provide access to further information about selected information items from the data store, including the information items posted by the first and second users in the user base that reference published computer security information items stored in the data store.

2. The system of claim 1 wherein the data store groups pluralities of the information items from different ones of the machine-readable information sources that each correspond to the same events.

3. The system of claim 1 wherein the user interfaces are operative to present different continuous successions of story items to different community users on their displays.

4. The system of claim 3 wherein the drill-down interface includes a story-item-based drill-down tool.

5. The system of claim 1 wherein the interactive user interfaces are operative to display images and text.

6. The system of claim 1 wherein the drill-down interface includes a map-based drill-down tool.

7. The system of claim 1 wherein the data store groups pluralities of the information items from different ones of the machine-readable information sources that each correspond to the same events.

8. The system of claim 1 wherein at least a plurality of the information items relate to a canonical computer security breach event.

* * * * *